UNITED STATES PATENT OFFICE.

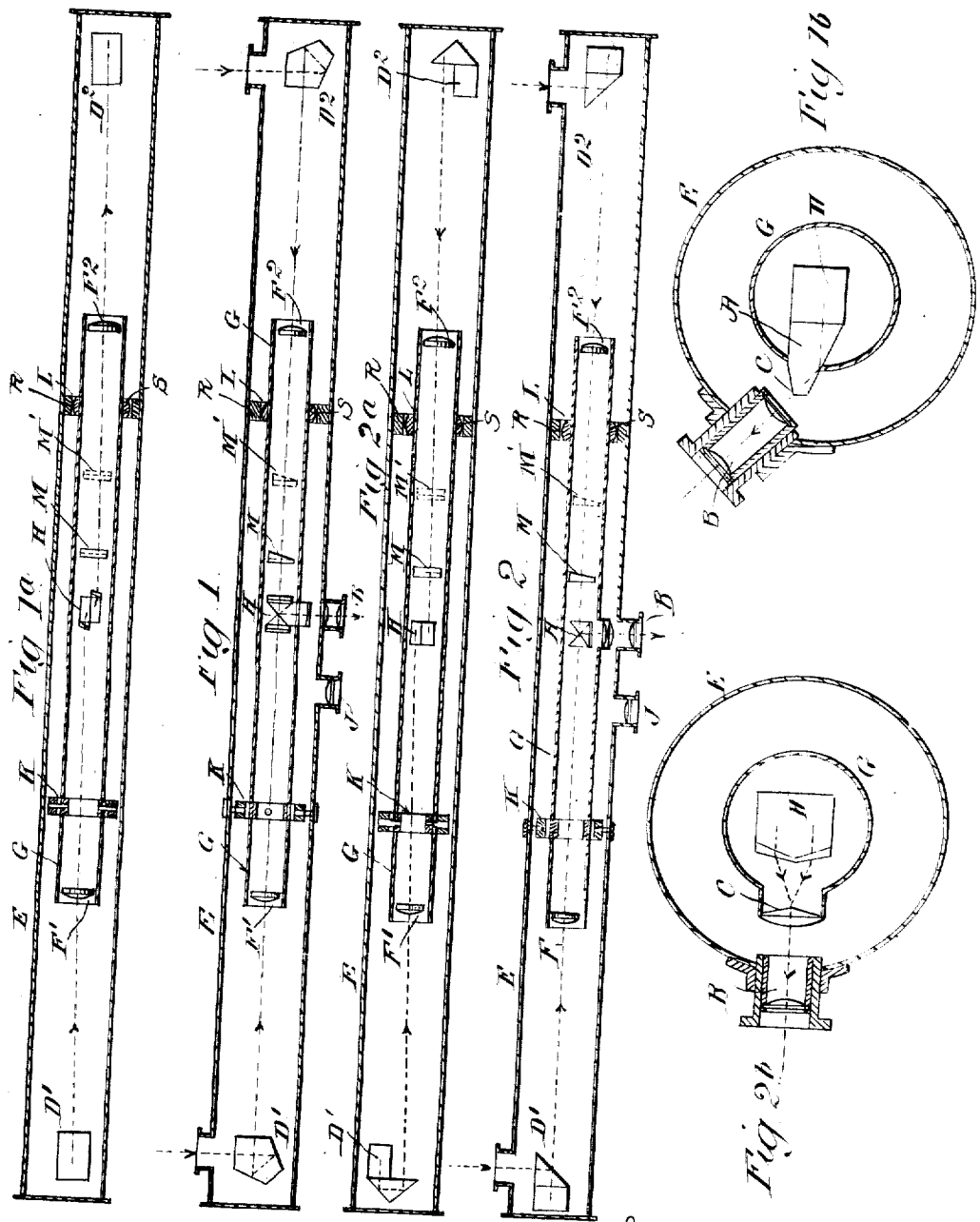

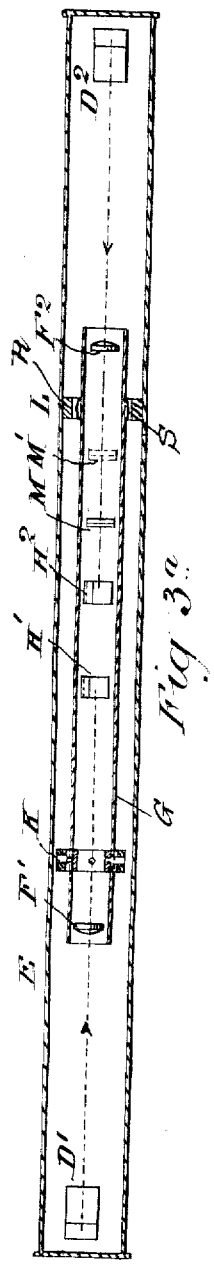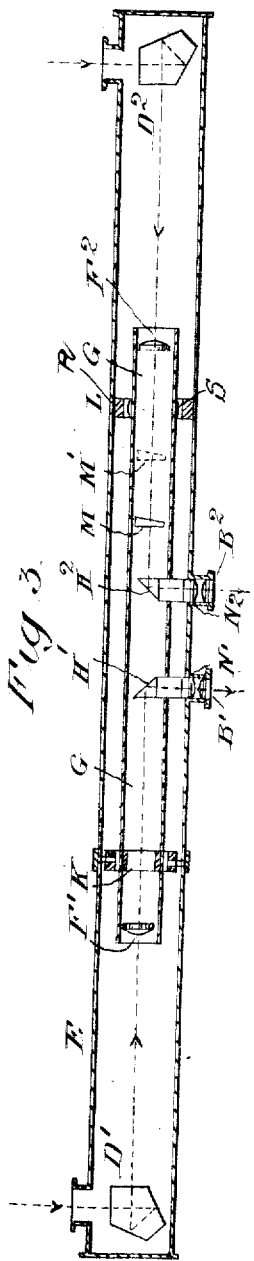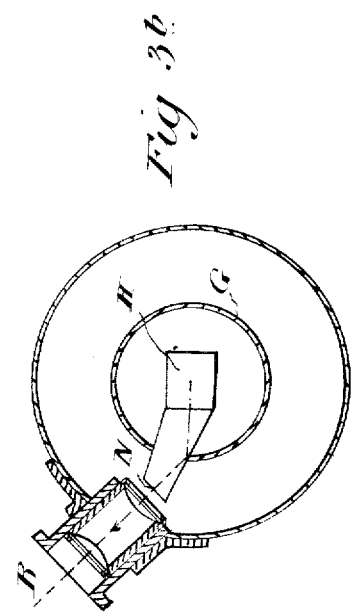

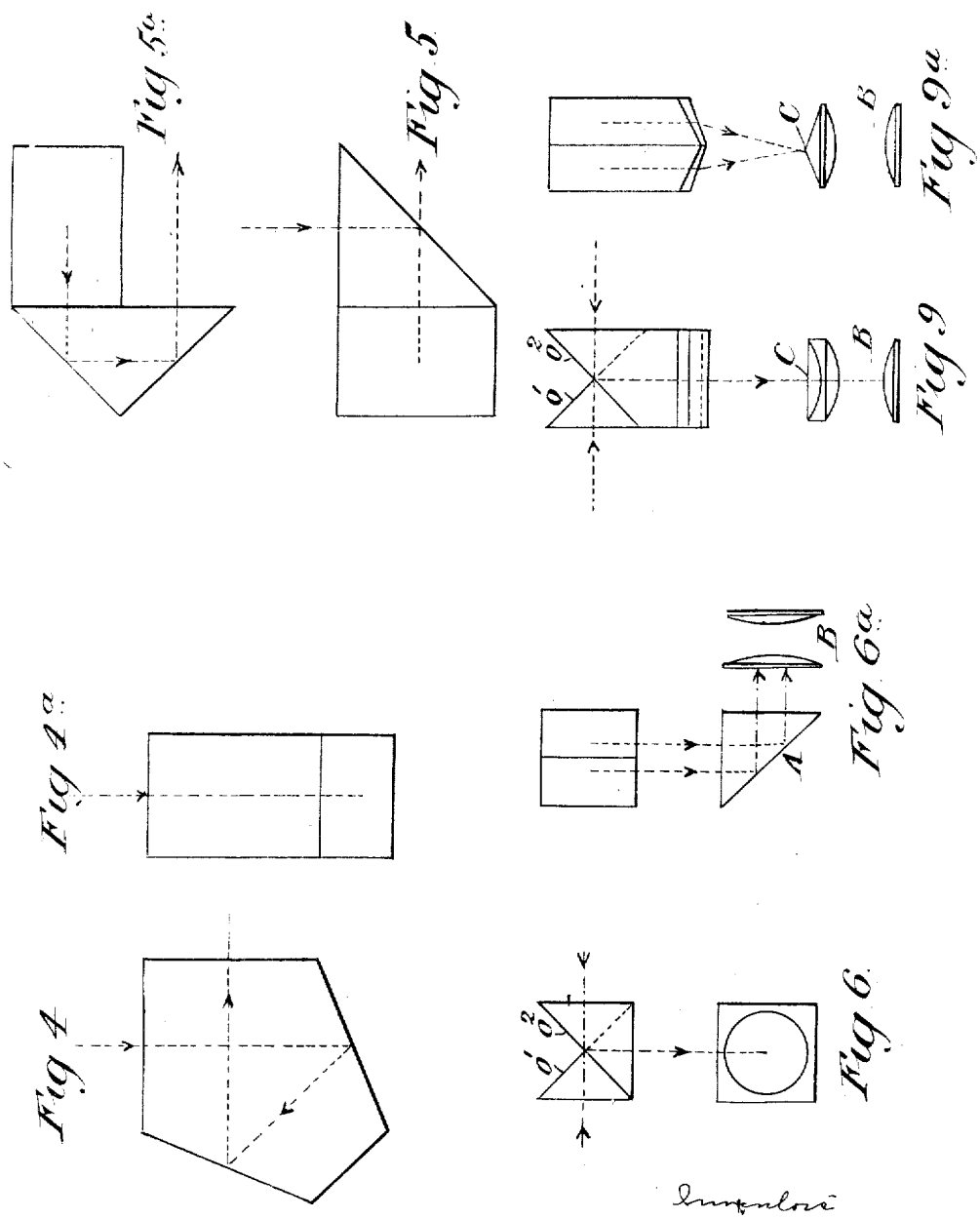

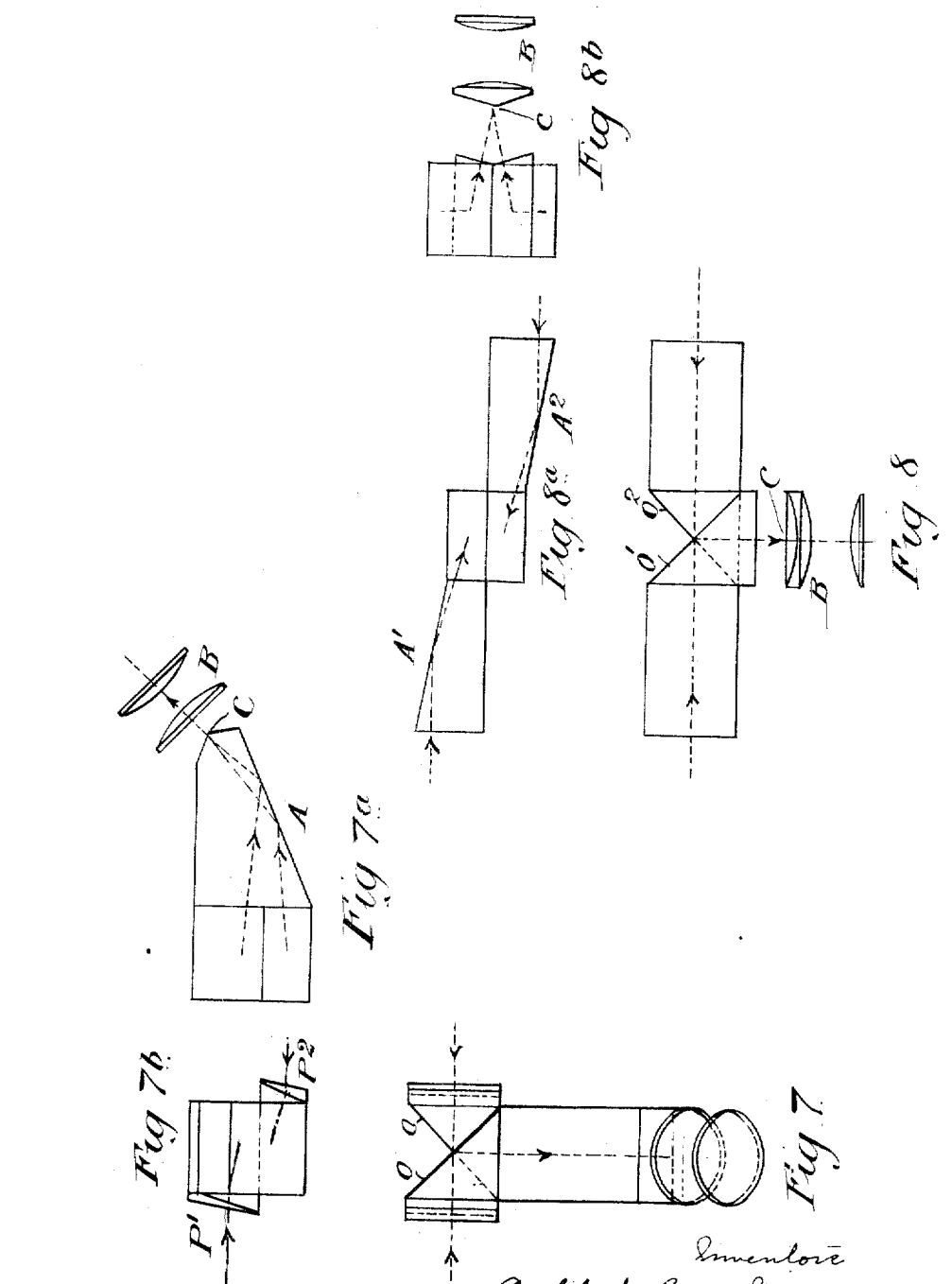

ARCHIBALD BARR, OF GLASGOW, SCOTLAND, AND WILLIAM STROUD, OF LEEDS, ENGLAND.

RANGE-FINDER OR TELEMETER.

944,649.

Specification of Letters Patent.   Patented Dec. 28, 1909.

Application filed December 2, 1903.   Serial No. 183,506.

*To all whom it may concern:*

Be it known that we, ARCHIBALD BARR, of Glasgow, Scotland, and WILLIAM STROUD, of Leeds, England, have invented certain new and useful Improvements in Range-Finders or Telemeters, of which the following is a specification.

Our invention has reference to improved rangefinders of the single observer, short base type.

The new or improved arrangements to be described are applicable not only to rangefinders working on the coincidence principle, but also to rangefinders working on the stereoscopic principles.

Figure 1 is a sectional plan and Fig. 1$^a$ a sectional elevation of a rangefinder working on the coincidence principle and embodying our present improvements. Fig. 1$^b$ is a cross section of the same through the eyepiece B. Figs. 2, 2$^a$ and 2$^b$ are corresponding views of an instrument of a modified construction. Figs. 3, 3$^a$ and 3$^b$ are corresponding views of a rangefinder embodying our present improvements but constructed to work upon the stereoscopic principle. Figs. 4 and 4$^a$ represent a type of end reflectors suitable for use in the instruments shown in Figs. 1 and 3. Figs. 5 and 5$^a$ show a type of end reflectors which we call inverting optical squares suitable for use in the instrument shown in Fig. 2. Figs. 6, 6$^a$, 7, 7$^a$ and 7$^b$, and 8, 8$^a$ and 8$^b$ represent three types of central reflectors (or eyepiece prisms) suitable for use in the instrument shown in Fig. 1. Figs. 9 and 9$^a$ represent a type of central reflectors (or eyepiece prisms) suitable for use in the rangefinder illustrated in Fig. 2.

In the various figures D$^1$ and D$^2$ represent compound reflectors constituting optical squares which are mounted at the ends to the outer casing E. These reflectors receive the beams from the distant object and after double reflection direct them toward the center of the casing.

G is an inner frame, shorter than the casing which may conveniently be of tubular form and which is carried within E in such a manner that forces applied to E in the working of the instrument will not sensibly deform the inner frame G. Such a system of support is shown in the figures as constituted of a gimbal K toward the left hand end of the inner frame G, and a bearing L toward the right hand end of G, consisting of a partial sphere R attached to G resting in a ring S attached to E.

F and F$^1$ are objectives located within the outer casing between the end reflectors and center of the casing through which the beams directed by the end reflectors pass. In the form of construction illustrated these objectives are carried at the ends of the inner frame.

H represents reflectors located centrally in the casing which direct the beams outward to the eyepiece. In the case of instruments working on the coincidence principle, the right eye only is used in making an observation, and in that case it is preferable to combine with the eyepiece prisms a separating prism operating in the manner described in a former patent No. 583,243, of 1897. In the accompanying drawings the separating edge is shown at C in Figs. 1$^b$ and 2$^b$, and also in the detail drawings of eyepiece prisms 7$^a$, 8 and 8$^b$, 9 and 9$^a$.

B represents the right eyepiece which in the case of rangefinders working on the coincidence principle as shown in Figs. 1 and 2 is alone used in making the observation. In these figures J represents a left eyepiece that may be used in viewing an illuminated scale placed within the outer casing E. In the stereoscopic rangefinder embodying our present improvements, both eyes are necessarily used in making observations, and in that case two eyepieces B$^1$ and B$^2$, Fig. 3, are used, each having in front of it an eyepiece prism system as shown at H$^1$ and H$^2$ in Figs. 3 and 3$^a$.

M and M$^1$ represent two positions of a refracting prism adapted to be moved along the path of one of the beams after it has traversed the objective, viz., in the examples of construction illustrated, the one from the right hand end of the instrument. This feature and the general mode of operation are common to rangefinders of the type to which this invention relates. In the operation of instruments working on the coincidence principle shown in Figs. 1 and 1$^a$, 2 and 2$^a$, two separated images of the distant object are formed and by adjusting the refracting prism M these are brought into coincidence or alinement, the degree of adjustment required being recorded on the scale thereby indicating the range of the object observed.

The mode of operating the stereoscopic rangefinder shown in Figs. 3 and 3ª is similar to that of the well-known Grousellier (or Zeiss) stereoscopic rangefinder except that in the present instrument there are two fixed marks, one in each field in the focus of the eyepiece, (say) upon the faces $N^1$ and $N^2$ (Fig. 3) and N (Fig. 3$^b$) of the prisms, and the refracting prism M is moved in the direction of the length of the tube by any suitable mechanism so as to alter the position of the image of the distant object formed by light entering at the right hand end of the instrument and passing through the object glass $F^2$ relatively to the image formed by light entering at the left hand end so as to make the image appear to be at the same distance from the observer as the image of the two fixed marks, when a scale suitably graduated and worked in accordance with the motion of the refracting prism M will indicate the distance of the object observed.

The new feature of the present invention consists in a new combination of optical and mechanical parts. In our former patents, in which two objectives are used, one at each end of the instrument (Nos. 567675 of 1898, 583243 of 1897) single reflectors were used at the ends of the instrument. Any bending of the frame carrying these reflectors would consequently affect the indications of the instrument, and this necessitated the carrying of the reflectors on the inner frame of the instrument. In the new form of rangefinder hereindescribed we use at the ends of the base a compound reflector constituting an optical square, and as the angle set out by such a square is practically independent of movement of the square about an axis parallel to its reflected surfaces, the square can be attached to the outer casing. This leads to a lighter and more convenient construction than that of our former instruments. These features we use in conjunction with others forming a new combination of parts constituting an improvement of hitherto known practice. We show two systems of producing erect images in instruments of this type. In Figs. 1 and 1ª the end reflectors are of non-inverting type of optical square, and in order to show erect images we reflect each beam, in a vertical plane in the central reflecting combination. Figs. 6 and 6ª show a simple method of erecting the images. In this case the beams of light, after reflection in a horizontal plane from surfaces $O^1$ and $O^2$ respectively, are reflected in a vertical plane from a surface A. The observer looks directly downward in viewing the images, and further, with the simple arrangement shown, the images are not separated by a separating line.

Figs. 7, 7ª and 7$^b$ show a preferable construction. The beams are refracted on entrance to the prisms at the inclined face $P^1$ and $P^2$ (the prisms are shown constructed in the well-known manner, of the two kinds of glass, so as to produce approximate achromatism) and strike the vertical reflecting faces $O^1$ and $O^2$ with a downward and upward inclination respectively. They next strike an inclined surface A, by means of which they are reflected in a vertical plane so as to fall at the separating edge C, and after refraction thence (as described in our earlier patent No. 583243 of 1897) they pass through an eyepiece directed downward at 45° (or other convenient angle). This constitutes a new and important improvement in rangefinders, for not only do we secure erect images when using non-inverting optical squares at the ends of the case, and the advantage of having the images separated at a separating line but also a downward inclination of the eyepiece which admits of the observer taking a much more comfortable attitude, either when holding the instrument in his hands (standing or sitting) or when kneeling or lying prone with the rangefinder rested upon a low support. It also allows of the instrument being placed much nearer the ground than is possible with the instrument in which the observer looks in the plane of triangulation, and this greatly facilitates the taking of cover from the enemy's observation when the rangefinder is used in field operations.

We are aware of the earlier patent granted to Brown and others, No. 788155 of 1903, in which they use a reflector to direct the beams of light through an eyepiece directed downward at right angles to the plane of triangulation and we do not claim the arrangement therein described, which does not accomplish the end we have in view. In Brown's patent the reflector is at the end of the base, and thus leads to a type of instrument that cannot be held and used in the manner we provide for in the present application where the eyepieces (or eyepiece) are situated at the center of the length of the instrument so that the rangefinder can be conveniently held in the hand, or conveniently handled when mounted on a stand. Further, in Brown's rangefinder a single objective is used and the advantages of a separating edge for the use of which in rangefinders only on the coincidence principle we retain in the combination of parts herein described.

In Fig. 1 the eyepiece B is shown as if it were placed in the horizontal plane, but when eyepiece prisms of the form shown in Figs. 6 or 7 are used, this eyepiece is directed more or less downward as shown in Figs. 1$^b$ 6ª or 7ª. In these cases the scale eyepiece J is conveniently inclined downward at the same angle. In some cases, however, it may be preferred to so construct the rangefinder that the observer looks horizontally toward the distant object while using the instrument. In some such cases, eyepiece prisms of the form shown in Figs. 8, 8ª and 8ᵇ may be used. These prisms together with non-inverting optical squares at the ends of the instrument give erect images and also provide the separating edge C. It will be observed that in this case the distinction is that the beams are reflected in a vertical plane from two reflecting surfaces A¹ and A² before they are reflected in the horizontal plane from the surfaces O¹ and O² instead of from one surface (Fig. 7ª) after reflection on the horizontal plane.

When inverting optical squares are used at the ends of the instrument, as in Figs. 2 and 2ª, it is not necessary to again reflect the beams in a vertical plane. In this case eyepiece prisms such as those shown in Figs. 9 and 9ª may be used, having a separating prism as shown at C.

Claims.

1. The combination in a rangefinder of the short base single observer type, of an outer casing, a compound reflector at each end of the outer casing, a shorter inner frame within the outer casing, a gimbal supporting the inner frame at one side of the center, a spherical bearing supporting the frame at the other side within the casing, an object glass at each end of the inner frame, and a set of reflecting prisms at the center of the inner frame, substantially as set forth.

2. The combination in a rangefinder of the short base single observer type, of an outer casing carrying at each end an optical square, a shorter inner frame supported within the outer casing, an object glass at each end of the inner frame, a set of prisms at the center of the length of the inner frame comprising reflecting surfaces approximately at right angles to the plane of triangulation and inclined at approximately 45° to the base line of the instrument for reflecting the beams of light in a direction approximately at right angles to the base line, and a separating edge at which the images are focused formed upon one part of the central reflecting combination, substantially as set forth.

3. The combination in a rangefinder of the short base single-observer type, of an outer casing carrying at each end an optical square, a shorter inner frame supported in the outer casing, an object glass at each end of the inner frame, a set of prisms at the center of the length of the inner frame comprising reflecting surfaces approximately at right angles to the plane of triangulation and inclined at approximately 45° to the base line of the instrument reflecting the beams of light in a direction approximately at right angles to the base line, and a separate prism through which the beams of light pass on their way to the eye of the observer, said prism having a separating edge at which the images are focused, all substantially as set forth.

4. The combination in a rangefinder of the short base single observer type, of an outer casing carrying at each end a non-inverting optical square, a shorter inner frame supported in the outer casing, an object glass at each end of the inner frame, a set of prisms at the center of the length of the inner frame comprising reflecting surfaces approximately at right angles to the plane of triangulation and inclined at approximately 45° to the base line of the instrument for reflecting the rays at approximately right angles to the base line, a reflecting surface at an angle to the plane of triangulation adapted to erect the images, and a separating edge at which the images are focused formed upon one part of the central reflecting combination, substantially as set forth.

5. The combination in a rangefinder of the short base single-observer type, of an outer casing carrying at each end a non-inverting optical square, a shorter inner frame supported in the outer casing, an object glass at each end of the inner frame, a set of prisms at the center of the length of the inner frame comprising reflecting surfaces at right angles to the plane of triangulation and inclined approximately 45° to the base line of the instrument for reflecting the rays at approximately right angles to the base line, a reflecting surface at an angle to the plane of triangulation adapted to erect the images, and a separate prism through which the beams of light pass on their way to the eye of the observer said prism having a separating edge at which the images are focused substantially as set forth.

6. The combination in a rangefinder of the short base single-observer type, of an outer casing carrying at each end a non-inverting optical square, a shorter inner frame supported in the outer casing, an object glass at each end of the inner frame, a set of prisms at the center of the length of the inner frame comprising reflecting surfaces at right angles to the plane of triangulation and inclined at approximately 45° to the base line of the instrument for reflecting the rays at approximately right angles to the base line, and two reflecting surfaces at which the beams are respectively reflected, in a vertical plane to cause the images to appear erect, substantially as set forth.

7. The combination in a rangefinder, of an outer casing carrying at each end an optical square, a shorter inner frame supported in the outer casing, an object glass at each end of the inner frame, and sets of reflecting prisms near the center of the length of the inner frame for reflecting the beams of light in a direction approximately at right angles to the base line, substantially as set forth.

8. A rangefinder of the short base single-observer type having reflectors at each end of the base arranged to direct the beams inward toward the center of the base, two objectives arranged between the end reflectors and the center of the base through which the beams of light respectively pass, a central reflecting prism combination adapted to direct the beams of light upward at an angle to the plane of triangulation and a downwardly directed eye-piece, substantially as set forth.

In testimony whereof we affix our signatures in presence of two witnesses.

ARCHIBALD BARR.
WILLIAM STROUD.

Witnesses:
JOHN LIDDLE,
JOSEPH HENRY PEARSON.